United States Patent
Kitai et al.

(10) Patent No.: US 11,316,412 B2
(45) Date of Patent: Apr. 26, 2022

(54) MOTOR INCLUDING SENSOR MAGNET

(71) Applicant: DENSO CORPORATION, Kariya (JP)

(72) Inventors: Toshiyuki Kitai, Kariya (JP); Kouichi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 149 days.

(21) Appl. No.: 16/475,291

(22) PCT Filed: Feb. 19, 2018

(86) PCT No.: PCT/JP2018/005612
§ 371 (c)(1),
(2) Date: Jul. 1, 2019

(87) PCT Pub. No.: WO2018/155350
PCT Pub. Date: Aug. 30, 2018

(65) Prior Publication Data
US 2019/0334416 A1   Oct. 31, 2019

(30) Foreign Application Priority Data

Feb. 21, 2017 (JP) .............................. JP2017-030130
Feb. 5, 2018 (JP) .............................. JP2018-018558

(51) Int. Cl.
*H02K 11/215* (2016.01)
*H02K 23/66* (2006.01)

(52) U.S. Cl.
CPC ........... *H02K 11/215* (2016.01); *H02K 23/66* (2013.01)

(58) Field of Classification Search
CPC ...... H02K 11/215; H02K 11/21; H02K 11/22; H02K 11/225; H02K 11/23; H02K 1/26;
(Continued)

(56) References Cited

U.S. PATENT DOCUMENTS 6,013,961 A * 1/2000 Sakamaki .............. H02K 23/66
310/68 B
6,340,856 B1   1/2002 Schiller
(Continued)

FOREIGN PATENT DOCUMENTS

JP     S63-15163 U    2/1988
JP     H06-66287 U    9/1994
(Continued)

OTHER PUBLICATIONS

"Weld Line". https://en.wikipedia.org/wiki/weld_line . . . (Year: 2021).*
(Continued)

*Primary Examiner* — Michael Andrews
(74) *Attorney, Agent, or Firm* — Oliff PLC

(57) ABSTRACT

A motor includes an annular sensor magnet rotated integrally with a rotation shaft of a rotor by a bushing, and a rotation detector arranged opposed to the sensor magnet to detect rotation information of the rotor. The bushing includes an annular fixing portion, which is fixed to the rotation shaft, and an extension, which extends from the fixing portion in an axial direction of the rotation shaft and is embedded in the sensor magnet. The extension includes an axial engagement portion engaged with the sensor magnet in the axial direction inside the sensor magnet.

6 Claims, 5 Drawing Sheets

(58) Field of Classification Search
CPC .......... H02K 1/28; H02K 23/66; H02K 13/00; H02K 13/006
USPC ...................................................... 310/68 B
See application file for complete search history.

(56) References Cited

U.S. PATENT DOCUMENTS

| | | | | |
|---|---|---|---|---|
| 6,462,450 | B1* | 10/2002 | Haussecker | G01B 7/30 310/156.09 |
| 2006/0063403 | A1* | 3/2006 | Kataoka | H02K 3/522 439/76.2 |
| 2008/0211325 | A1* | 9/2008 | Rienhardt | H02K 11/30 310/43 |
| 2013/0200888 | A1* | 8/2013 | Kim | G01B 7/30 324/207.25 |

FOREIGN PATENT DOCUMENTS

| | | |
|---|---|---|
| JP | H11-352201 A | 12/1999 |
| JP | 2008-206354 A | 9/2008 |
| JP | 5959693 B1 * | 8/2016 |
| JP | 2016-226094 A | 12/2016 |

OTHER PUBLICATIONS

Machine translation of JP-5959693-B1. (Year: 2016).*
Apr. 17, 2018 Search Report issued in International Application No. PCT/JP2018/005612.

* cited by examiner

MOTOR INCLUDING SENSOR MAGNET

TECHNICAL FIELD

The present disclosure relates to a motor.

BACKGROUND ART

A conventional motor includes a rotation detector that detects rotation information of a rotation shaft such as the number of revolutions or a rotation speed (refer to, for example, Patent Document 1).

The motor of Patent Document 1 incorporates a unit including a detection element such as a Hall element that detects changes in a magnetic field of a sensor magnet attached to a rotation shaft so as to rotate integrally with the rotation shaft.

The sensor magnet used in the motor of Patent Document 1 is injection molded integrally with a bushing (magnet plate in Patent Document 1) fixed to the rotation shaft.

PRIOR ART DOCUMENT

Patent Document

Patent Document 1: Japanese Laid-Open Patent Publication No. 2008-206354

SUMMARY OF THE INVENTION

Problems that the Invention is to Solve

In a motor such as that described above, the sensor magnet is injection molded integrally with the bushing. In such a structure, the sensor magnet may become separated from the bushing.

It is an object of the present disclosure to provide a motor that obviates separation of the sensor magnet.

Means for Solving the Problems

In order to achieve the above object, a motor according to one aspect of the present disclosure includes an annular sensor magnet rotated integrally with a rotation shaft of a rotor by a bushing; and a rotation detector arranged opposed to the sensor magnet to detect rotation information of the rotor. The bushing includes an annular fixing portion, which is fixed to the rotation shaft, and an extension, which extends from the fixing portion in an axial direction of the rotation shaft and is embedded in the sensor magnet. The extension includes an axial engagement portion engaged with the sensor magnet in the axial direction inside the sensor magnet.

MODES FOR CARRYING OUT THE INVENTION

First Embodiment

A motor according to a first embodiment will now be described.

Figure 1:
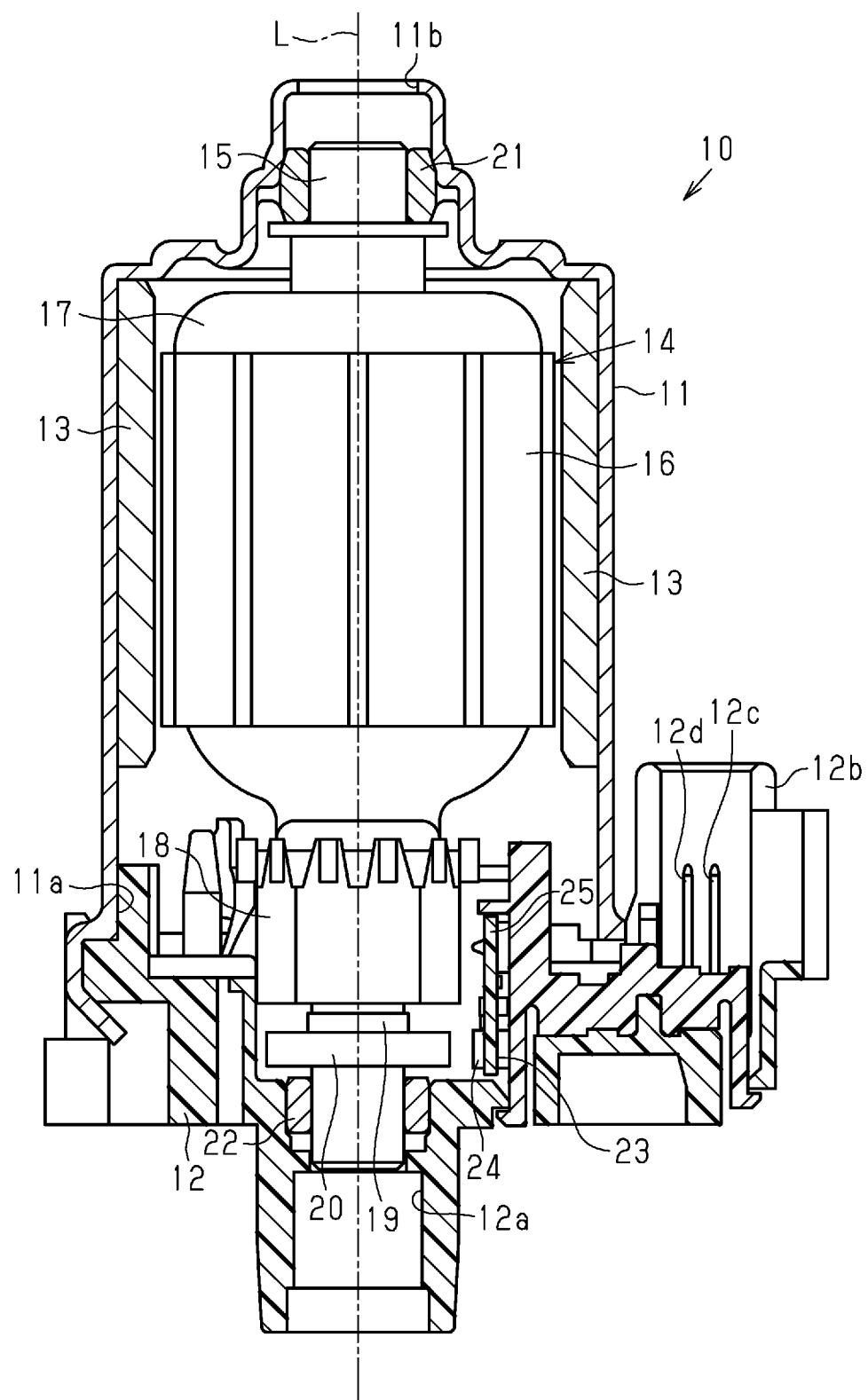
FIG. 1 is a cross-sectional view of a motor according to a first embodiment.

As shown in FIG. 1, a motor 10 according to the present embodiment includes a substantially tubular yoke 11 having a closed end and an end bracket 12 fixed to substantially close an opening 11a of the yoke 11.

As shown in FIG. 1, field magnets 13 are fixed to an inner circumferential surface of the yoke 11. An armature (rotor) 14 is rotatably accommodated at the inner side of the field magnets 13.

The armature 14 includes a rotation shaft 15, a core 16 secured to the rotation shaft 15, windings 17 wound around the core 16, and a commutator 18 fixed to a portion of the rotation shaft 15 located toward the distal end (closer to opening 11a of yoke 11) from the core 16 and connected to the windings 17. A bushing 19 and a sensor magnet 20 are fixed to the rotation shaft 15 located toward the distal end from the commutator 18.

The armature 14 is arranged on the rotation shaft 15. The rotation shaft 15 has a proximal end rotationally supported by a bearing 21 held at the bottom center of the yoke 11. The proximal end of the rotation shaft 15 can be connected through a through-hole 11b formed in the bottom center of the yoke 11 to a connection portion of a load. The end bracket 12 is fixed to the opening 11a of the yoke 11 to substantially close the opening 11a in a state accommodating the armature 14.

As shown in FIG. 1, the end bracket 12 is made of a plastic material and formed to have a predetermined shape in order to close the opening 11a of the yoke 11. A through-hole 12a extends through the center of the end bracket 12 in axial direction L for insertion of the distal end portion of the rotation shaft 15. The distal end portion of the rotation shaft 15 is rotationally supported by a bearing 22 held inside the through-hole 12a. The distal end portion of the rotation shaft 15 can be connected through the through-hole 12a of the end bracket 12 to a connection portion of the load.

A connector 12b is formed integrally with the end bracket 12 to project outward (outward in radial direction) from the yoke 11. The connector 12b is substantially box-shaped so that an external connector extending from an external device (both not shown) is fitted to the connector 12b in axial direction L of the motor 10. The connector 12b includes a power supply terminal 12c and a signal output terminal 12d.

The power supply terminal 12c supplies power from the external device to a power supply brush (not shown). The signal output terminal 12d outputs a signal from a rotation detector 23 that detects rotation speed as rotation information of the armature 14 (rotation shaft 15) to the external device.

The rotation detector 23 is arranged on the end bracket 12, in which a Hall IC 24 is arranged on a substrate 25. The Hall IC 24 is arranged on the substrate 25 directly opposing the sensor magnet 20 in the radial direction.

As shown in FIGS. 2 to 6, the bushing 19 includes an annular main body 31 press-fitted and fixed to the rotation shaft 15, a flange 32 extending from one axial direction L end of the main body 31 in a direction orthogonal to axial direction L (radially outward), and two extensions 33, 34 extending from outer edge ends of the flange 32 in axial direction L. In this example, the main body 31 and the flange 32 correspond to a fixing portion.

Figure 3:
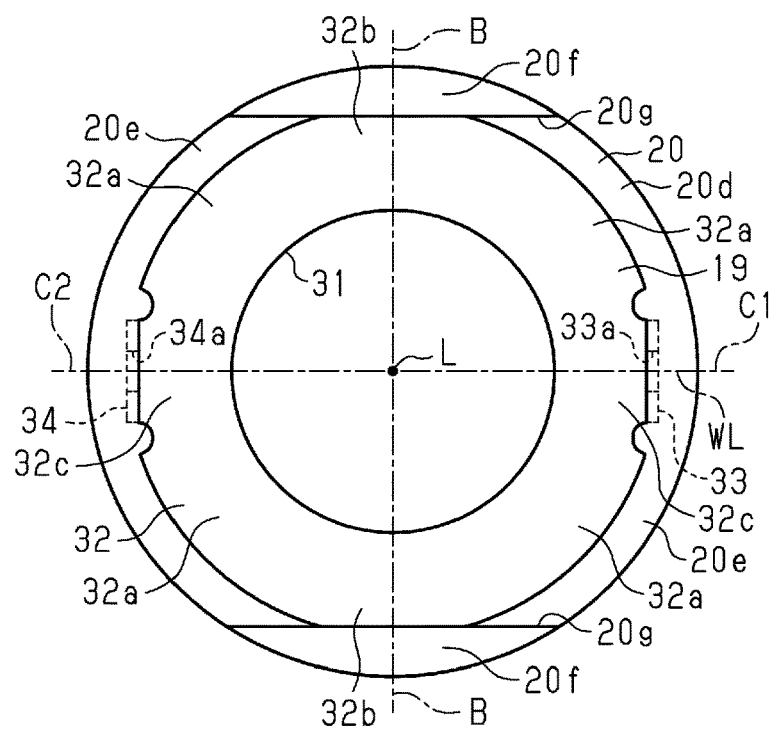
FIG. 3 is a bottom view of the bushing shown in FIG. 1.

As shown in FIG. 3, the flange 32 includes outer arcuate portions 32a having arcuate outer circumferential portions, outer straight portions 32b having straight outer circumferential portions, and connection portions 32c having outer circumferential portions continuous with the extensions 33, 34.

There are a total of four outer arcuate portions 32a arranged at substantially 90-degree intervals in the circumferential direction. Each outer arcuate portion 32a has two circumferential ends adjacent to an outer straight portion 32b and a connection portion 32c. There are a total of two outer straight portions 32b arranged at substantially 180-degree intervals in the circumferential direction. Each outer straight portion 32b has two circumferential ends adjacent to outer arcuate portions 32a. The outer straight portions 32b are formed so that the straight parts in the outer edges have substantially the same length and are substantially parallel. There are a total of two connection portions 32c arranged at substantially 180-degree intervals in the circumferential direction. Each connection portion 32c has two circumferential ends adjacent to outer arcuate portions 32a.

Figure 2:
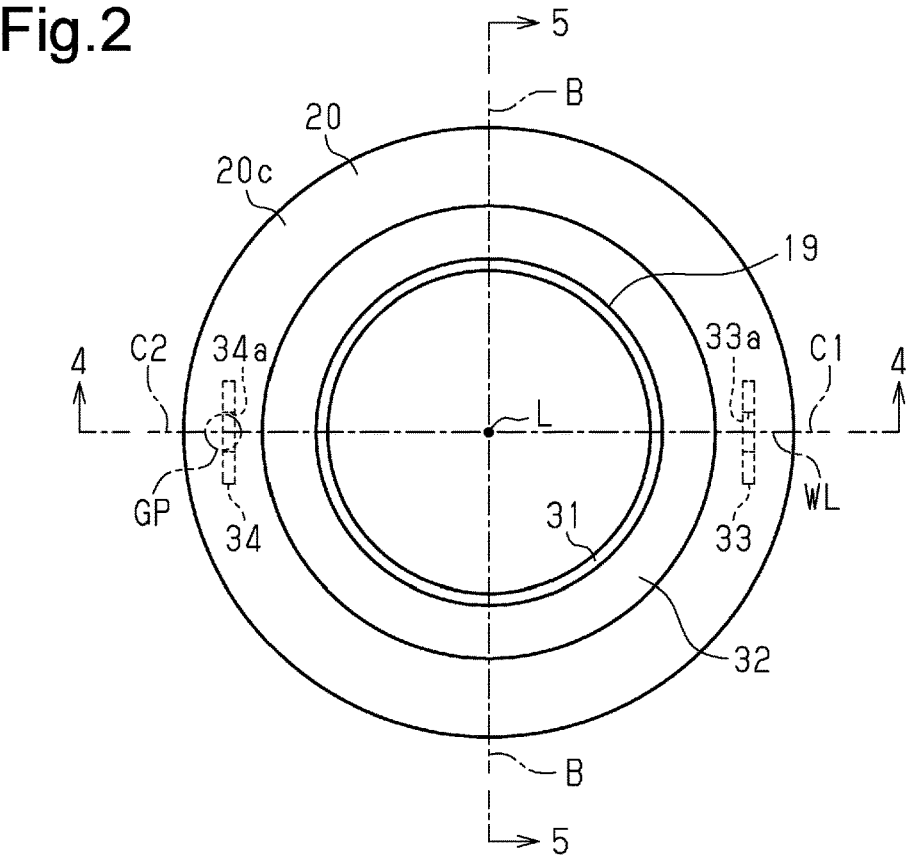
FIG. 2 is a plan view of a bushing shown in FIG. 1.
Figure 4:
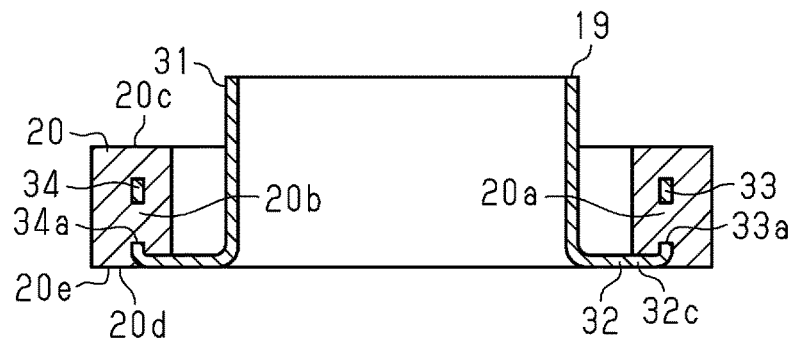
FIG. 4 is a cross-sectional view taken along line 4-4 in FIG. 2.
Figure 5:
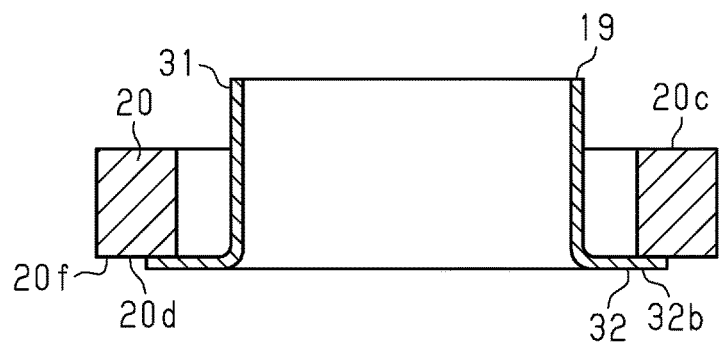
FIG. 5 is a cross-sectional view taken along line 5-5 in FIG. 2.
Figure 6:
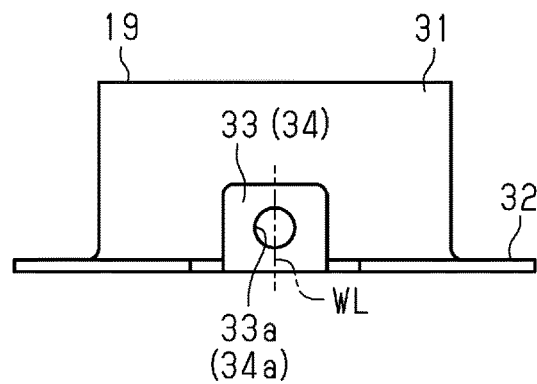
FIG. 6 is a side view of the bushing shown in FIG. 2.

As shown in FIGS. 2 to 4, the extensions 33, 34 are arranged at substantially 180-degree intervals in the circumferential direction. The extensions 33, 34 respectively include through-holes 33a, 34a extending in the radial direction orthogonal to the extension direction of the extensions 33, 34.

As shown in FIGS. 2 to 5, the sensor magnet 20 is tubular and formed integrally with the bushing 19 so that one end in axial direction L abuts the flange 32 and the extensions 33, 34 are embedded. The sensor magnet 20 includes inserted portions 20a, 20b inserted into the through-holes 33a, 34a of the extensions 33, 34. The sensor magnet 20 is spaced apart from the main body 31 of the bushing 19 in the radial direction.

Weld line WL of the sensor magnet 20 is set at the same position in the circumferential direction as the through-hole 33a of the extension 33, which is one of the two extensions 33, 34 and the inserted portion 20a. More specifically, weld line WL is set to be located over the through-hole 33a and the inserted portion 20a. An inner circumferential surface of the through-hole 33a is configured to abut the inserted portion 20a at two circumferential sides relative to weld line WL to maintain an engagement state. That is, the through-hole 33a functions as a circumferential engagement portion. In other words, the two circumferential sides of the inserted portion 20a abut against the inner circumferential surface of the through-hole 33a and engage the inner circumferential surface of the through-hole 33a.

Gate position GP for molding the sensor magnet 20 is set at the same position as the through-hole 34a of the extension 34, which is the other one of the two extensions 33, 34, and the inserted portion 20b so that when filling a mold with the material of the sensor magnet 20, weld line WL is located at substantially the same position as the through-hole 33a of the extension 33 and the inserted portion 20a in the circumferential direction.

The sensor magnet 20 is magnetized so that the magnetic polarities of an outer circumferential surface include one N-pole and one S-pole in the circumferential direction.

As shown in FIGS. 2 and 3, the sensor magnet 20 is magnetized so that one magnetic pole center C1 is located at the same position as the extension 33 in the circumferential direction. Thus, the sensor magnet 20 is magnetized so that the other magnetic pole center C2 is located at the same position as gate position GP in the circumferential direction.

As shown in FIGS. 2 and 3, the sensor magnet 20 has one flat end surface 20c. The sensor magnet 20 has another end surface 20d including first surfaces 20e, second surfaces 20f, and steps 20g. The first surfaces 20e and the second surfaces 20f are flat, and the steps 20g are arranged at the boundaries between the first surfaces 20e and the second surfaces 20f. More specifically, the steps 20g are arranged so that the first surfaces 20e project from the second surfaces 20f.

In the present embodiment, magnetic pole centers C1, C2 of the sensor magnet 20 are arranged at substantially the central positions of the first surfaces 20e in the circumferential direction. Boundary B of the magnetic poles of the sensor magnet 20 is arranged at substantially the central positions of the second surfaces 20f in the circumferential direction.

The steps 20g between the first surfaces 20e and the second surfaces 20f are arranged on the end surface 20d of the sensor magnet 20. Thus, even after the bushing 19 and the sensor magnet 20 are attached to the armature 14 (rotation shaft 15), the positions of the extensions 33, 34, and weld line WL are determined with reference to the steps 20g arranged at one side in the axial direction (opposite side of core 16). This allows for magnetization while checking the positions that are to be magnetized.

In the motor 10 configured as described above, the rotation shaft 15 may, for example, move in axial direction L depending on the situation. In such a case, the flange 32 may slide on (abuts) the bearing 22 in axial direction L. However, the main body 31 of the bushing 19 is press-fitted to the rotation shaft 15. This limits displacement of the sensor magnet 20 in the axial direction, abutment of the sensor magnet 20 against the commutator 18, and further movement of the rotation shaft 15 toward the bearing 22 in axial direction L even if the flange 32 slides on the bearing 22.

The operation of the motor 10 according to the present embodiment will now be described.

The motor 10 according to the present embodiment is configured to rotate the armature 14 (rotation shaft 15) when power is supplied from the power supply brush (not shown) to the windings 17 through the commutator 18. The rotation detector 23 detects the sensor magnet 20 arranged on the rotation shaft 15 so that rotation information of the motor 10 is output to an external device connected through the connector 12b.

The advantages of the present embodiment will now be described.

(1) The inserted portion 20a in the through-hole 33a engages the through-hole 33a in the axial direction. In other words, the through-hole 33a functions as an axial engagement portion. This prevents separation of the sensor magnet 20 in the axial direction and improves strength.

(2) The extension 33 of the bushing 19 includes the through-hole 33a at a position including (overlapping) weld line WL created when the sensor magnet 20 is molded so that the through-hole 33a is filled with the material molding the sensor magnet 20 and covers the extension 33. Even if force acting to separate the sensor magnet 20 from the bushing 19 in the circumferential direction is generated at weld line WL of the sensor magnet 20, the through-hole 33a and the inserted portion 20a are in engagement in the circumferential direction of the bushing 19 because of the inserted portion 20a including the through hole 33a into which the sensor magnet 20 is inserted. Even when the sensor magnet 20 is about to crack in the circumferential direction of the bushing 19 from weld line WL, the inner circumferential surface of the through-hole 33a and weld line WL are in engagement in the circumferential direction of the bushing 19. This restricts separation in the circumferential direction of the bushing 19 from to weld line WL and improves strength. Further, the extension 33 is configured to engage the sensor magnet 20 in the radial direction. This restricts separation of the sensor magnet 20 in the radial direction. Further, the distal end portion of the extension 33 is covered with the sensor magnet 20. This reduces exposure of the distal end portion of the extension 33 and avoids damage inflicted by the extension 33 of the bushing 19 to other members.

(3) The magnetic pole center C1 of the sensor magnet 20 is set to overlap weld line WL so that weld line WL does not affect and disturb the magnetic flux of the sensor magnet 20.

(4) The extensions 33, 34 are arranged at equal angular intervals in the circumferential direction of the main body 31 of the bushing 19. This limits imbalanced rotation of the rotation shaft 15. In this example, a total of two extensions 33, 34 are arranged at 180-degree intervals in the circumferential direction. This reduces the number of the extensions 33, 34, simplifies the shape, and improves the strength of the sensor magnet 20 as described above.

(5) The end surface 20d of the sensor magnet 20 includes the step 20g, which serves as a positioning portion used as a reference when the sensor magnet 20 is magnetized. This allows for magnetization to be performed using the step 20g as a reference even after, for example, the bushing 19 and the sensor magnet 20 are attached to the rotation shaft 15 of the armature 14.

(6) The bushing 19 is press-fitted and fixed to the rotation shaft 15 as described above so that stress acting to widen the bushing 19 in the radial direction is generated. The sensor magnet 20 is formed integrally with the main body 31 of the bushing 19 in a state spaced apart in the radial direction. Thus, the stress applied when the bushing 19 is press-fitted is not directly transmitted to an inner side of the sensor magnet 20 in the radial direction. This avoids cracking of the sensor magnet 20.

Second Embodiment

A second embodiment of the motor will now be described. The basic configuration of the motor according to the present embodiment is substantially the same as the first embodiment. The description hereafter will focus on differences from the first embodiment.

Figure 8:
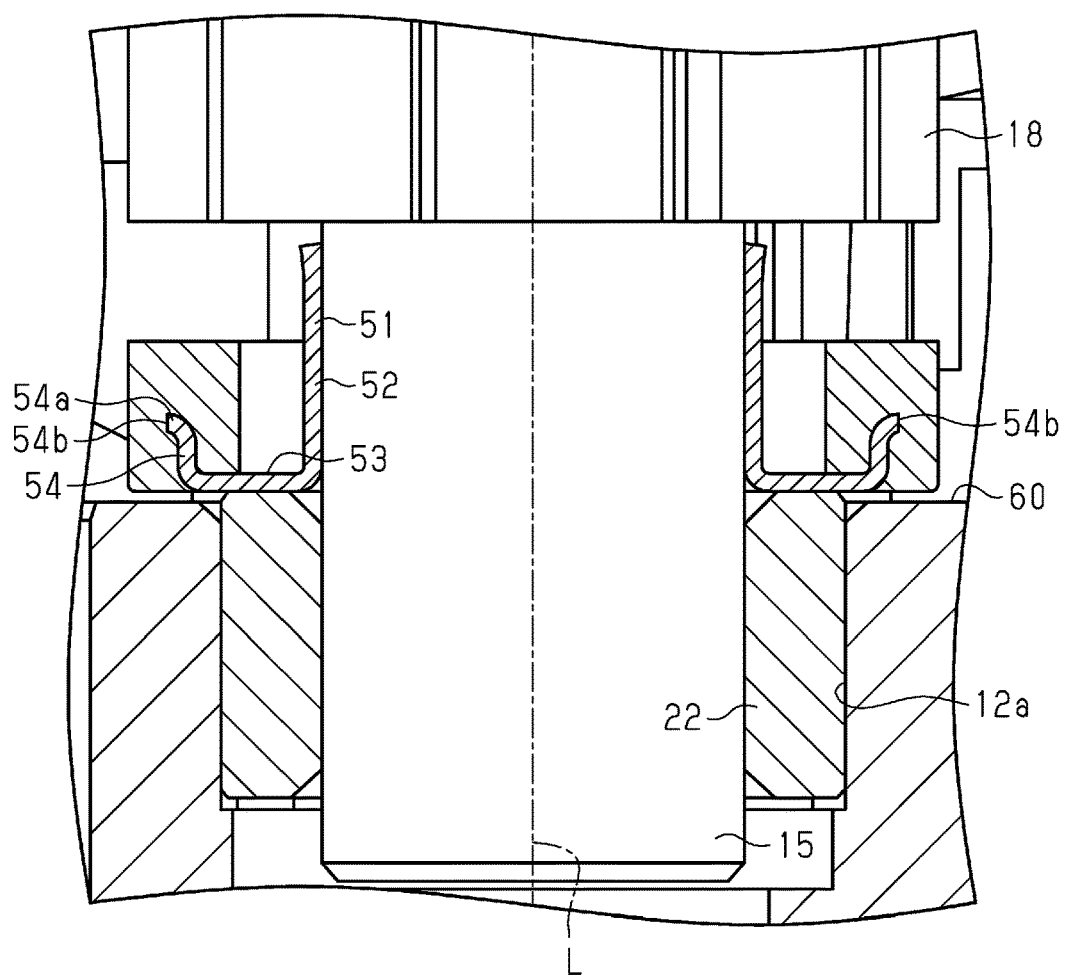
FIG. 8 is a cross-sectional view showing part of a motor according to a second embodiment.
Figure 9:
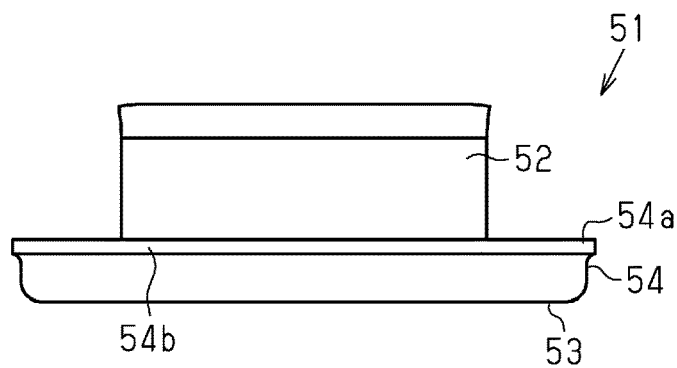
FIG. 9 is a side view of a bushing shown in FIG. 8.

As shown in FIGS. 8 and 9, a bushing 51 of the motor 10 according to the present embodiment includes an annular main body 52, a flange 53 extending from one axial direction L end of the main body 52 in a direction orthogonal to axial direction L (outward in radial direction), and a tubular extension 54 extending from an outer edge end of the flange 53 in axial direction L. In this example, the main body 52 and the flange 53 correspond to the main body 31 and the flange 32 of the first embodiment.

The main body 52 of the bushing 51 is press-fitted and fixed to the rotation shaft 15 of the motor 10.

As shown in FIGS. 8 and 9, the extension 54 is formed so that a distal end portion 54a is radially widened at a distal end side in an extension direction. The extension 54 including the distal end portion 54a is substantially covered with the tubular sensor magnet 20.

The bushing 51 of the present embodiment is formed, for example, by pressing and punching a metal plate and then drawing the metal plate. When punching the metal plate, a distal end surface 54b of the distal end portion 54a corresponding to a cut surface may have a sheared surface or a broken surface. A sheared surface formed in the distal end surface 54b will have streaks in the cutting direction and the broken surface formed in the distal end surface 54b will have irregularities. Thus, by covering the distal end portion 54a (distal end surface 54b) with the sensor magnet 20, the sensor magnet 20 and the distal end portion 54a will be engaged with each other in the circumferential direction to serve as a rotation stopper. The broken surface of the distal end surface 54b not only serves to stop rotation but also engages the sensor magnet 20 in the axial direction and serves to restrict separation in the axial direction.

The sensor magnet 20 of this example is spaced apart from the main body 52 of the bushing 51 in the radial direction in the same manner as the first embodiment. Thus, stress generated with the rotation shaft 15 when press-fitting the bushing 51 is not directly transmitted to the inner side of the sensor magnet 20 in the radial direction. This avoids cracking of the sensor magnet 20.

The flange 53 of the bushing 51 in the present embodiment can abut against the bearing 22 in axial direction L. In a state where the flange 53 of the bushing 51 abuts against the bearing 22 in axial direction L, the sensor magnet 20 is located radially outward from the bearing 22 so that the sensor magnet 20 does not abut against the bearing 22. Further, in this example, the bearing 22 is configured to project toward the commutator 18 from an axial direction end surface 60 located at one side (toward commutator 18) in the axial direction of the through-hole 12a that holds the bearing 22. Thus, when the flange 53 of the bushing 51 abuts against the bearing 22 in axial direction L, the sensor magnet 20 is spaced apart from the axial direction end surface 60. The bearing 22 and the sensor magnet 20 do not directly slide on each other. This avoids cracking of the sensor magnet 20 caused by wear resulting from sliding.

In this example, the main body 52 of the bushing 51 is press-fitted to the rotation shaft 15. This limits displacement of the sensor magnet 20 in the axial direction, abutment of the sensor magnet 20 against the commutator 18, and further movement of the rotation shaft 15 toward the bearing 22 in axial direction L even if the flange 32 slides on the bearing 22.

The operation of the motor 10 according to the present embodiment will now be described.

In the bushing 51 of the motor 10 according to the present embodiment, the distal end portion 54a of the extension 54 is configured to be radially widened and engage the sensor magnet 20 in the axial direction.

The advantages of the present embodiment will now be described.

(6) The distal end portion 54a of the extension 54 of the bushing 51 is widened to engage the sensor magnet 20 in the axial direction. This restricts separation of the sensor magnet 20 in the axial direction.

The embodiments may be modified as described below.

Figure 7:
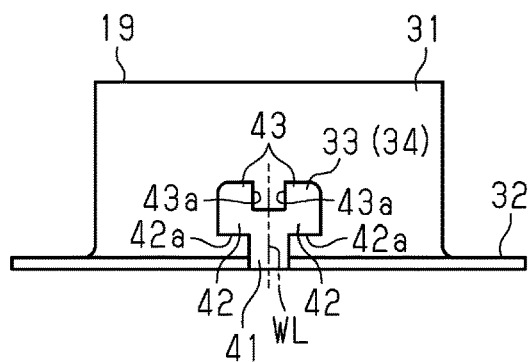
FIG. 7 is a side view of a bushing in a modification of the first embodiment.

In the first embodiment, the extension 33 includes the through-hole 33a as a circumferential engagement portion but may be changed to the structure shown in FIG. 7.

As shown in FIG. 7, the extension 33 includes a first axial extension 41 extending from the flange 32 in the axial direction of the rotation shaft 15, circumferential extensions 42 extending from the distal end of the first axial extension 41 toward two circumferential sides, and second axial extensions 43 extending from the circumferential extensions 42 in the axial direction of the rotation shaft 15. With this structure, the space around the first axial extension 41 and below the circumferential extensions 42 is filled with the material for molding the sensor magnet 20. Thus, lower surfaces 42a of the circumferential extensions 42 engage the sensor magnet 20 in the axial direction of the rotation shaft 15. This restricts separation of the sensor magnet 20 in the axial direction.

Further, the space between the two second axial extensions 43 is filled with the material for molding the sensor magnet 20. Thus, opposed surfaces 43a located at two circumferential sides relative to weld line WL engage the sensor magnet 20 in the circumferential direction. In other words, the opposed surfaces 43a function as a circumferential engagement portion. This restricts separation of the sensor magnet 20 in the circumferential direction from weld line WL and improves strength. Further, the extension 33 is configured to engage the sensor magnet 20 in the radial direction. This restricts separation of the sensor magnet 20 in the radial direction.

The extension 34 may have the same structure and thereby obtain the same advantages.

In the first embodiment, the end surface 20d of the sensor magnet 20 is configured to include the step 20g as a positioning portion. Instead, the end surface 20d of the sensor magnet 20 may include a projection. Further, the positioning portion such as the step 20g may be omitted. In the second embodiment, the end surface 20d of the sensor magnet 20 may include the positioning portion (step 20g) or omit the positioning portion.

In the first embodiment, a total of two extensions 33, 34 are arranged at 180-degree intervals in the circumferential direction. Instead, a total of four extensions may be arranged at 90-degree intervals in the circumferential direction or a total of eight extensions may be arranged at 45-degree intervals in the circumferential direction. Further, the extensions 33, 34 do not need to be arranged at equal angular intervals in the circumferential direction and may be arranged in plural positions at non-equal intervals in the circumferential direction. Further, there may be only one extension.

In the first embodiment, one gate position and one weld line WL are arranged at positions corresponding to the extensions 33, 34s. Instead, an extension may be arranged only at the position that corresponds to weld line WL.

When plural gates are set for a mold for molding the sensor magnet 20, the extensions may be arranged in correspondence with at least one weld line WL. Further, the extensions may be arranged to correspond to plural weld lines WL.

When plural gates are set for the mold and the gates are arranged at non-equal angular intervals, plural weld lines WL will are arranged at non-equal angular intervals. In this case, the extensions may be arranged to in correspondence with at least one weld line or in correspondence with all of the weld lines.

In the first embodiment, weld line WL is set at a position that overlaps the center of the magnetic pole of the sensor magnet 20. Instead, weld line WL may be set at a position that overlaps a boundary of the magnetic pole of the sensor magnet 20. Further, when weld line WL is set at a position other than the boundary of the magnetic pole of the sensor magnet 20, weld line WL does not affect and disturb a magnetic flux.

In the first embodiment, the through-holes 33a, 34a extend through the extensions 33, 34. Instead, plural through-holes may extend through each of the extensions 33, 34. In the two extensions 33, 34, the through-hole 33a extends through only the extension 33 that corresponds to weld line WL and the through-hole 34a that corresponds to gate position GP may be omitted.

In the above embodiment, the present invention is applied to a motor incorporating a brush but may also be applied to a brushless motor including the bushing 19 and the sensor magnet 20 as described above.

Figure 10A:
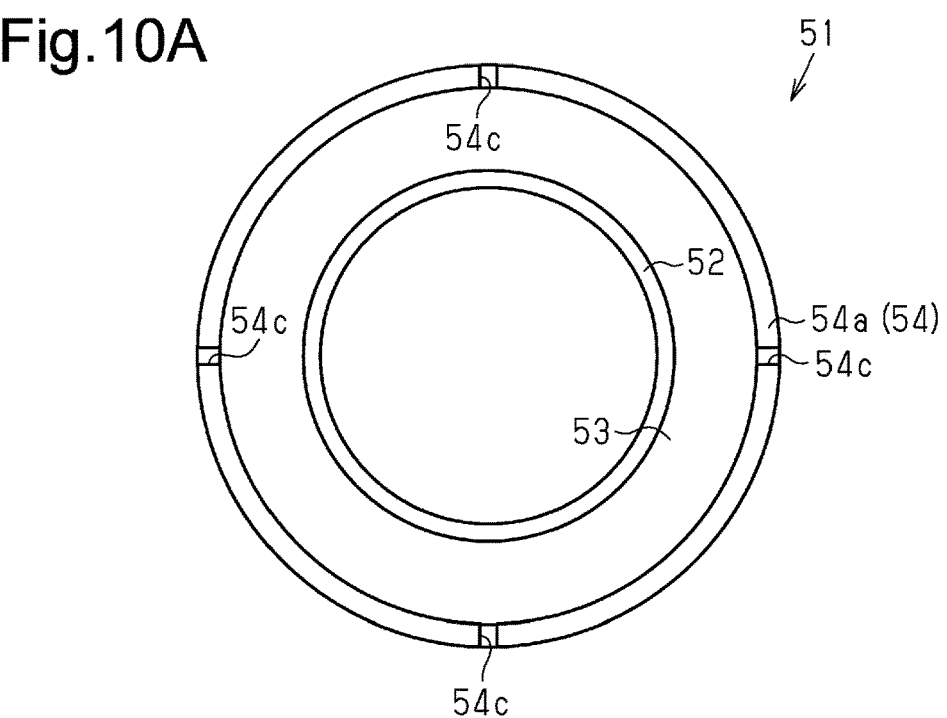
FIG. 10A is a plan view of a bushing in a modification of the second embodiment.
Figure 10B:
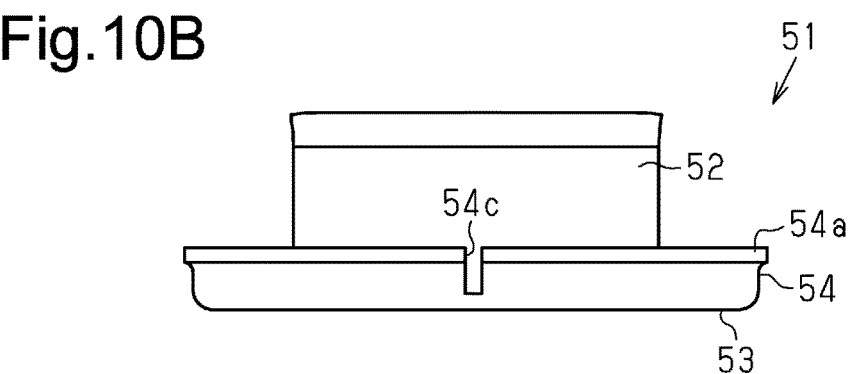
FIG. 10B is a side view of the bushing in the modification of the second embodiment.

In addition to the second embodiment above, the extension 54 may include slits 54c extending in axial direction L, for example, at equal angular intervals in the circumferential direction (at 90-degree intervals in the circumferential direction in FIG. 10A) as shown in FIGS. 10A and 10B. The slits 54c are arranged so that part of the sensor magnet 20 is inserted into the slit 54c in the same manner as the inserted portion 20a into which the sensor magnet 20 is inserted in the first embodiment. Thus, the sensor magnet 20 engages the slit 54c at two circumferential sides. This is further effective for restricting rotation of the sensor magnet 20 in the circumferential direction.

The slits 54c may be positioned to correspond to weld line WL as in the first embodiment to provide the same advantages as (2). Further, the slits 54c may be arranged at non-equal intervals in the circumferential direction.

Further, other than the slits 54c, a through-hole may be arranged in the same manner as the first embodiment.

In the second embodiment, the distal end portion 54a of the extension 54 is configured to be radially widened. Instead, the distal end portion 54a may be configured to be tilted inward in the radial direction and engage the sensor magnet 20 in the axial direction.

In the above embodiments, the sensor magnet 20 is magnetized to have one N-pole and one S-pole but may be magnetized to have two N-poles and two S-poles or four N-poles and four S-poles.

The above embodiments and modifications may be combined when necessary.

Technical ideas comprehended from the above embodiments and modifications will now be described below.

(Appendix 1)

A motor including an annular sensor magnet rotated integrally with a rotation shaft of a rotor by a bushing; and a rotation detector arranged opposed to the sensor magnet to detect rotation information of the rotor, wherein the bushing includes an annular fixing portion, which is fixed to the rotation shaft, and an extension, which extends from the fixing portion in an axial direction of the rotation shaft and is embedded in the sensor magnet, and the extension includes an engagement portion that engages the sensor magnet in a circumferential direction at least at two circumferential sides relative to a weld line created when the sensor magnet is molded.

With this structure, the extension includes the engagement portion that engages the sensor magnet in a circumferential direction at least at two circumferential sides relative to a weld line created when the sensor magnet is molded. Thus, even when the sensor magnet is about to crack in the circumferential direction from weld line WL, the engagement portion restricts separation in the circumferential direction and improves strength of the sensor magnet.

(Appendix 2)

The motor according to appendix 1, wherein a magnetic pole center of the sensor magnet is set to overlap the weld line.

With this structure, the magnetic pole center of the sensor magnet is set to overlap the weld line so that weld line does not affect and disturb the magnetic flux of the sensor magnet.

(Appendix 3)

The motor according to appendix 1 or 2, wherein the extension is one of a plurality of extensions arranged at equal angular intervals in a circumferential direction of a main body of the bushing.

With this structure, the extension includes extensions arranged at equal angular intervals in the circumferential direction of the main body of the bushing. This limits imbalanced rotation of the rotation shaft.

(Appendix 4)

The motor according to any one of appendixes 1 to 3, wherein the sensor magnet includes an end surface that includes a positioning portion used as a reference when the sensor magnet is magnetized.

With this structure, the end surface of the sensor magnet includes the positioning portion used as a reference when the sensor magnet is magnetized. This allows for magnetization to be performed using the positioning portion as a reference even after, for example, the bushing and the sensor magnet are attached to the rotation shaft of the rotor.

(Appendix 5)

The motor according to appendix 3, wherein the extension includes two extensions arranged at 180-degree intervals in the circumferential direction of the main body of the bushing.

With this structure, two extensions are arranged at equal angles in the circumferential direction. This limits imbalanced rotation of the rotation shaft.

The invention claimed is:

1. A motor comprising:
   an annular sensor magnet rotated integrally with a rotation shaft of a rotor by a bushing;
   a rotation detector arranged opposed to the sensor magnet to detect rotation information of the rotor; and
   a bearing that rotationally supports the rotation shaft, wherein
   the bushing includes an annular main body, which is fixed to the rotation shaft, a flange extending radially outward from an axial end of the main body, and an extension that extends from the flange in an axial direction of the rotation shaft and is embedded in the sensor magnet,
   the extension includes a distal end portion that is radially widened and engaged with the sensor magnet in the axial direction inside the sensor magnet,
   the main body and the extension overlap each other in a radial direction of the rotation shaft, and
   the sensor magnet is located radially outward from the bearing so that the sensor magnet does not abut against the bearing in a state where the flange of the bushing abuts against the bearing.

2. The motor according to claim 1, wherein the extension is one of a plurality of extensions arranged at equal angular intervals in a circumferential direction of the bushing.

3. The motor according to claim 1, wherein the sensor magnet includes an end surface that includes a positioning portion used as a reference when the sensor magnet is magnetized.

4. The motor according to claim 1, wherein the sensor magnet is spaced apart from the main body of the bushing in the radial direction.

5. The motor according to claim 1, further comprising an end bracket that holds the bearing, wherein
   the end bracket includes an axial direction end surface located toward the rotor, and
   the bearing is configured to project toward the rotor from the axial direction end surface of the end bracket.

6. A motor comprising:
   an annular sensor magnet rotated integrally with a rotation shaft of a rotor by a bushing; and
   a rotation detector arranged opposed to the sensor magnet to detect rotation information of the rotor, wherein
   the bushing includes an annular main body, which is fixed to the rotation shaft, a flange extending radially outward from an axial end of the main body, and an extension that extends from the flange in an axial direction of the rotation shaft and is embedded in the sensor magnet,
   the extension includes distal end portion that is radially widened and engaged with the sensor magnet in the axial direction inside the sensor magnet,
   the main body and the extension overlap each other in a radial direction of the rotation shaft, and
   the extension includes slits extending in the axial direction of the rotation shaft at equal angular intervals in a circumferential direction of the bushing.

* * * * *